(12) United States Patent
Sun et al.

(10) Patent No.: US 7,715,178 B2
(45) Date of Patent: May 11, 2010

(54) DIGITAL SIGNAGE REPLACEMENT MODULE

(75) Inventors: Kuo-Tsung Sun, Hsinchu (TW);
Jing-Lin Zhang, Hsinchu (TW);
Shen-Hsiung Chou, Hsinchu (TW);
Hung-Pin Chen, Hsinchu (TW);
Hung-Yen Chiu, Hsinchu (TW);
Ding-Hua Ting, Hsinchu (TW);
Tsan-Chung Lee, Hsinchu (TW)

(73) Assignee: Wincomm Corporation, Hsinchu (TW)

( * ) Notice: Subject to any disclaimer, the term of this patent is extended or adjusted under 35 U.S.C. 154(b) by 68 days.

(21) Appl. No.: 12/017,936

(22) Filed: Jan. 22, 2008

(65) Prior Publication Data

US 2009/0185345 A1    Jul. 23, 2009

(51) Int. Cl.
*G06F 1/16* (2006.01)
*H05K 5/00* (2006.01)
*H05K 7/00* (2006.01)

(52) U.S. Cl. ............... 361/679.02; 361/621; 361/623

(58) Field of Classification Search ............ 361/679.02, 361/679.21, 679.23
See application file for complete search history.

(56) References Cited

U.S. PATENT DOCUMENTS

| | | | |
|---|---|---|---|
| 5,754,396 A * | 5/1998 | Felcman et al. .......... | 361/679.6 |
| 6,098,131 A * | 8/2000 | Unger et al. ............. | 361/679.4 |
| 6,188,573 B1 * | 2/2001 | Urita ..................... | 361/679.48 |
| 6,191,943 B1 * | 2/2001 | Tracy .................... | 361/679.55 |
| 6,445,579 B1 * | 9/2002 | Singleton, Jr. ......... | 361/679.26 |
| 6,538,880 B1 * | 3/2003 | Kamijo et al. .......... | 361/679.09 |
| 6,643,127 B1 * | 11/2003 | Richardson ............. | 361/679.4 |
| 7,002,811 B2 * | 2/2006 | Jing et al. .............. | 361/801 |
| 7,218,362 B2 * | 5/2007 | Kim ...................... | 349/58 |
| 2003/0030991 A1 * | 2/2003 | Riddiford et al. ........ | 361/683 |
| 2005/0099766 A1 * | 5/2005 | Fraley et al. ............ | 361/685 |
| 2005/0146855 A1 * | 7/2005 | Brehm et al. ........... | 361/724 |
| 2007/0008691 A1 * | 1/2007 | Kim ...................... | 361/683 |
| 2008/0002350 A1 * | 1/2008 | Farrugia ................. | 361/681 |
| 2008/0074837 A1 * | 3/2008 | Denny et al. ........... | 361/685 |

* cited by examiner

*Primary Examiner*—Jayprakash N Gandhi
*Assistant Examiner*—Adrian S Wilson
(74) *Attorney, Agent, or Firm*—Schmeiser, Olsen & Watts LLP

(57) ABSTRACT

The invention provides a digital signage replacement module. The digital signage has a main circuit board and a plug-board disposed therein and connected to each other. The plug-board has a plug-card with a plug-slot, and a track disposed on each side thereof. The digital signage is covered up by a back cover so that an opening can be formed at one side edge of the digital signage. The computer module has a frame and a motherboard. The frame has a rail disposed on each side thereof and the motherboard has a slot and a connecting terminal disposed thereon. The slot has an interface socket card. The computer module can be placed into the digital signage through the opening with the rail placed into the track. Therefore, the connecting terminal is connected to the plug-slot and the computer module can be drawn out for maintenance.

7 Claims, 4 Drawing Sheets

DIGITAL SIGNAGE REPLACEMENT MODULE

BACKGROUND OF THE INVENTION

1. Field of the Invention

The present invention relates to a digital signage replacement module and, particularly, to a design in which a computer module can be placed into and can be drawn out of a digital signage in order that maintenance can be performed conveniently by the maintenance personnel.

2. Description of the Prior Art

Nowadays, various digital signages can be found in the market. Digital signage is a form of electronic display that shows information, advertising and other messages. Digital signs can be found in public and private environments, such as retail stores and corporate buildings.

Although the advertiser may perform the operation of updating information or advertisement in such a way as being described above, he would have a lot of trouble when the computer mounted on the digital signage needs to be repaired due to failure or the information renewed. For this, the whole digital signage must be removed so that the computer can be opened for maintenance or data renewal. It would take a very long time of which a major part is wasted by removing and returning the digital signage. Such operations are rather inconvenient to the maintenance personnel and cost a great deal of time and labor.

Since the conventional way has such drawbacks as described above, it is hardly a good one. An improvement is required urgently. In view of the above difficulties associated with the conventional design, the present inventor, through a long-term study and practice, has set about the work of improvement and innovation that provides a digital signage replacement module.

SUMMARY OF THE INVENTION

The primary aspect of the present invention is to provide a digital signage replacement module. The computer module can be placed into the digital signage and can be drawn out of the digital signage with a rail thereof running along a track of a plug-board. Therefore, the maintenance can be performed directly by the maintenance personnel.

Another aspect of the present invention is to provide a digital signage replacement module in which the computer module has interface socket cards to plug in display cards, video cards and the like so as to effectively enhance the diversification of functions.

A further aspect of the present invention is to provide a digital signage replacement module that is simply structured and can be maintained conveniently.

A digital signage replacement module for achieving the above aspects principally comprises a digital signage, a main circuit board, a plug-board, a back cover and a computer module. The digital signage has the main circuit board and the plug-board disposed therein. The main circuit board is connected to the plug-board through a connector. The plug-board has a plug-card disposed thereon. The plug-card having a plug-slot disposed on one side and a track disposed on each side at the lower end thereof. The back cover may cover up the back side of the digital signage and has an indentation opened in the position corresponding to the computer module. An opening, where the computer module can be placed through onto the plug-board, may form between the indentation and the digital signage as the back cover covers up. The computer module has a frame and a motherboard. The frame has a handle disposed at one side edge thereof and a rail disposed on each side at the lower end. The motherboard, being disposed on the frame, has a slot and a connecting terminal. The slot having an interface socket card plugged thereon with a plurality of interface card slots for interface cards (e.g., display card, video card). As the rail of the computer module is placed into the track of the plug-board, the terminal of the computer module is connected to the plug-slot of the plug-card so that the computer module replacement design of the digital signage according to the present invention is fulfilled. All the maintenance personnel needs for the purpose for maintenance is only to hold the handle of the computer module and draw it outward.

These features and advantages of the present invention will be fully understood and appreciated from the following detailed description of the accompanying drawings.

DESCRIPTION OF THE PREFERRED EMBODIMENT

Figure 1:
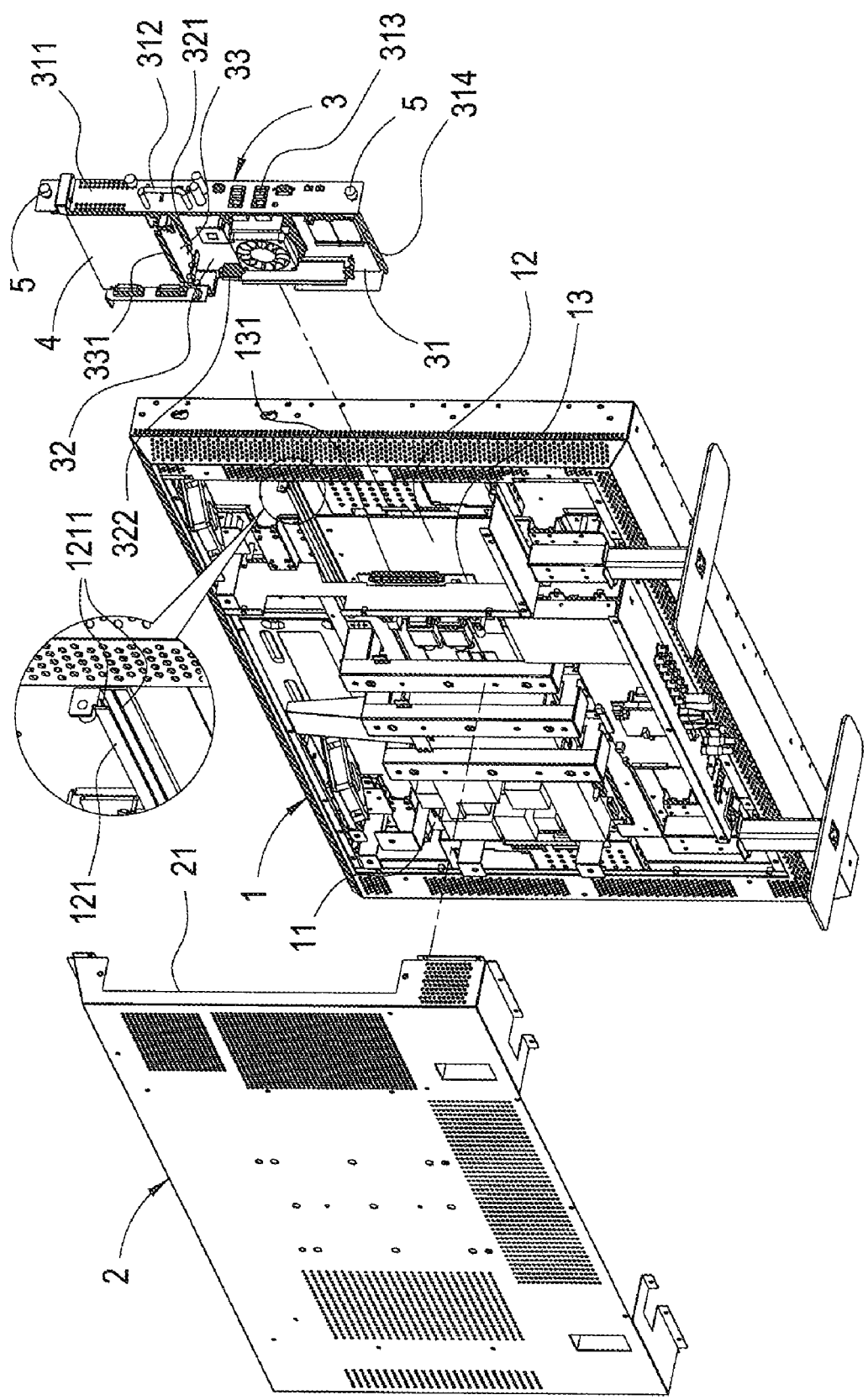
FIG. 1 is an exploded view for the digital signage replacement module.
Figure 2:
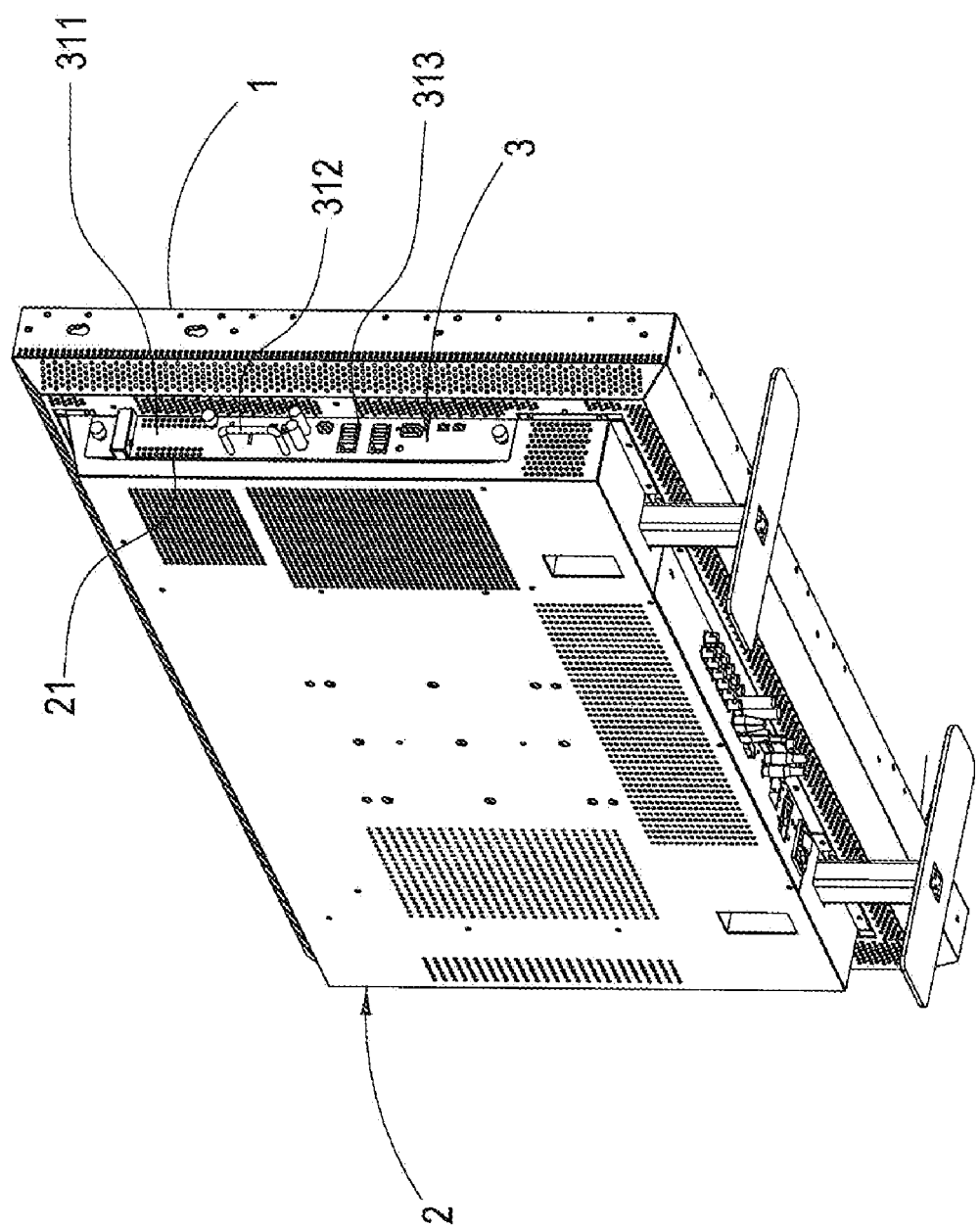
FIG. 2 is a combinational view for the digital signage replacement module.
Figure 3:
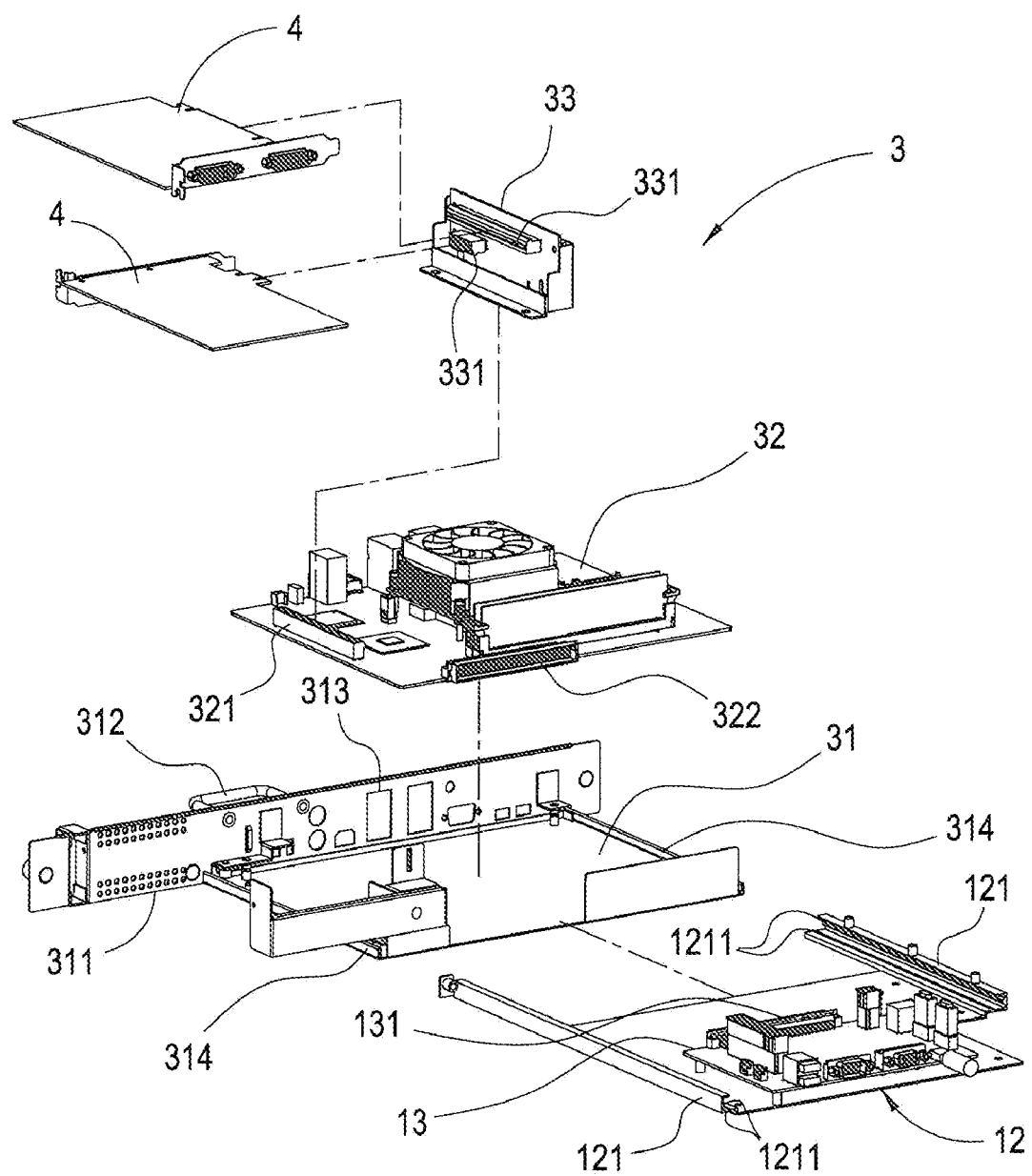
FIG. 3 is an exploded view for the computer module and the plug-board of the digital signage replacement module.

Referring to FIG. 1 to 4, which are views for the digital signage replacement module according to the present invention. The digital signage replacement module comprises a digital signage, a back cover and a computer module.

The digital signage panel 1 has the Motherboard 11 and the adaptor 12 disposed therein. The Motherboard 11 is connected to the adaptor 12 through a connector and the adaptor 12 has a connector interface 13 disposed thereon. The connector interface 13 has a connector 131 disposed on one side thereof, and a track 121 disposed on each side at the lower end thereof The track 121 has at least one raised line 1211 disposed thereon;

The back cover 2 has an indentation 21 opened at one side edge thereof. The indentation 21 is opened in the position corresponding to the adaptor 12 so that an opening 6, as shown in FIG. 4, can be formed between the indentation 21 and the digital signage panel 1 as the back cover 2 covers up the digital signage panel 1.

The circuit board module 3 has a frame 31 and a circuit board 32. The frame 31 has a side cover 311 disposed on one side thereof. The side cover 311 has fixtures 5 disposed at both end thereof and has a handle 312 and a plurality of through-holes 313 disposed thereon, and a rail 314 disposed on each side at the lower end thereof. The circuit board 32, being disposed on the frame 31, has a slot 321 disposed on one side thereof and a connecting terminal 322 disposed on the other one side thereof. The slot 321 has an interface socket card 33 plugged thereon with at least one interface card slot 331 and the connecting terminal 322 being connected to the connector 131 of the connector interface 13. Therefore, the circuit board module 3 can be placed into the digital signage panel 1 through the indentation 21 of the back cover 2 with the rail 314 thereof placed into the track 121 of the adaptor 12. The interface card slot 331 is provided for plugging interface cards 4 (e.g., display card, video card and the like).

Figure 4:
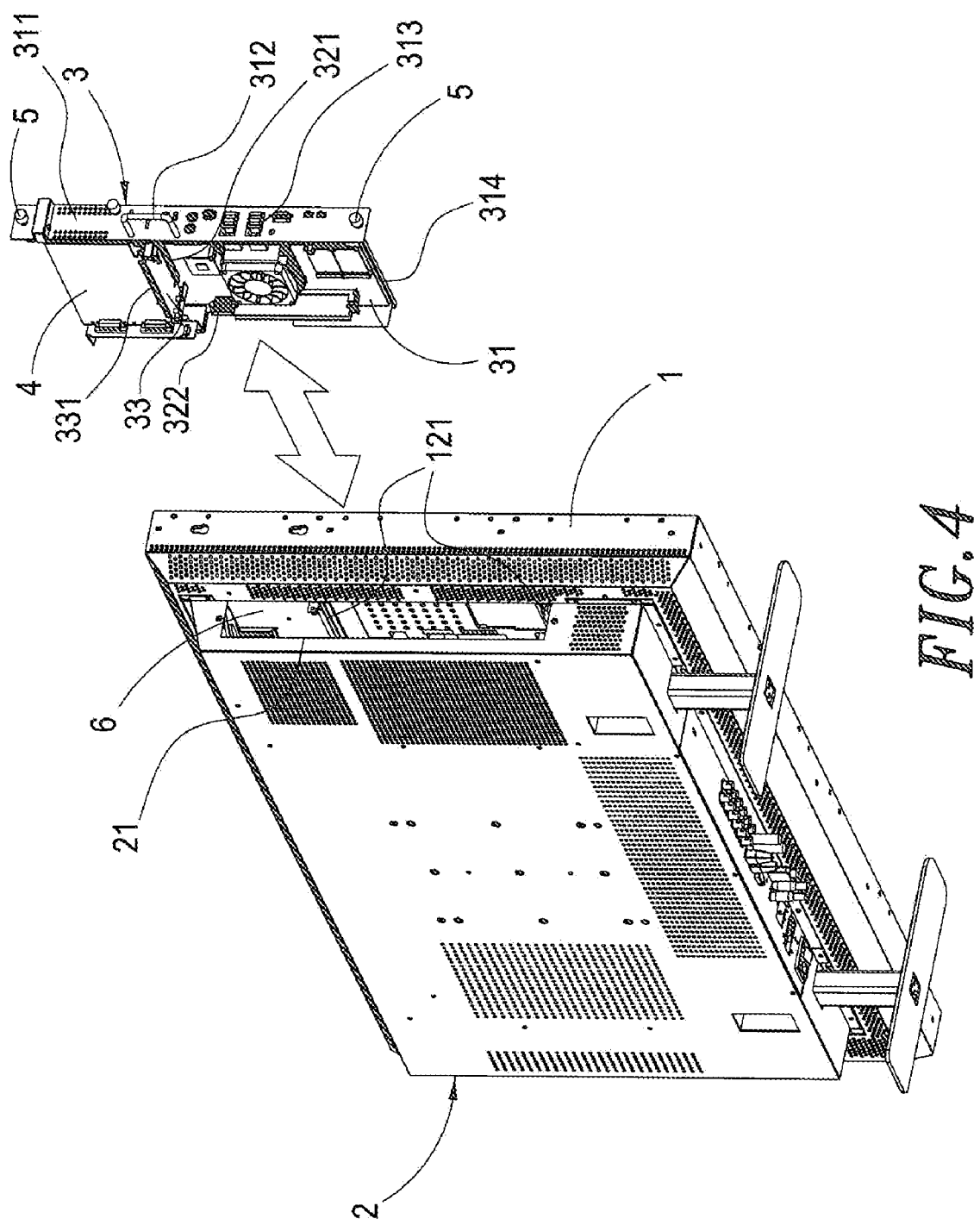
FIG. 4 is a schematic diagram of operation for the digital signage replacement module.

As shown in FIG. 4, as the circuit board module 3 is placed into the digital signage panel 1 through the opening 6. The side cover 311 of the circuit board module 3 covers up at the opening 6. The circuit board module 3 can be fixed on the back cover 2 by using the fixtures 5, which are locking knobs, buckle pieces or other positioning members.

The digital signage replacement module according to the present invention is constituted by the elements as described above. As shown in FIG. 4, all the maintenance personnel needs for maintenance is only to hold the handle 312 of the circuit board module 3 and draw it outward. The circuit board module 3 can be drawn easily by utilizing at least one raised line 1211 disposed on the track 121; therefore, the friction generated during drawing the circuit board module 3 can be reduced greatly. As a result, the capability of drawing the computer module according to the present invention renders the circuit board module 3 drawn out quite easily for maintenance. Moreover, the function of the circuit board module 3 is enhanced greatly by the way that the circuit board module 3 can have various interface cards 4 plugged.

The advantages of the digital signage replacement module according to the present invention are as follows:

1. The present invention provides a digital signage replacement module in which the computer module can be placed into the digital signage and can be drawn out of the digital signage with a rail thereof running along a track of a plug-board in order that the computer module can be taken out directly and maintenance can be performed easily by the maintenance personnel.

2. The present invention provides a digital signage replacement module in which the computer module can be drawn out directly for maintenance without wasting time for removing the digital signage, so that time and labor can be significantly saved.

3. The present invention provides a digital signage replacement module in which the computer module has interface socket cards to plug in display cards, video cards and the like so as to enhance the diversification of functions.

4. The present invention provides a digital signage replacement module that is simply structured and can be maintained conveniently.

The invention provides a digital signage replacement module. The signage has a main circuit board and a plug-board disposed therein and connected to each other. The plug-board has a plug-card with a plug-slot, and track disposed on each side thereof. The digital signage is covered up by a back cover so that an opening can be formed at one side edge of the digital signage. The computer module has a frame and motherboard. The frame has a rail disposed on each side thereof and the motherboard has a slot and a connecting terminal disposed thereon. the slot has an interface socket card. The computer module can be placed into the digital signage through the opening with the rail placed into the track. Therefore, the connecting terminal is connected to the plug-slot and the computer module can be drawn out for maintenance.

Many changes and modifications in the described above embodiment of the invention can, of course, be carried out without departing from the scope thereof. Accordingly, to promote the progress in science and the useful arts, the invention is disclosed and is intended to be limited only by the scope of the appended claim.

What is claimed is:

1. A digital signage replacement module, which uses a display to show advertising information and other messages, comprising:

a digital signage panel, having a motherboard and a adapter disposed therein, wherein the motherboard is connected to the adapter through a connector and the adapter comprising a connector interface disposed thereon, the connector interface comprising a connector disposed on one side thereof, and a track disposed on each side at the lower end thereof;

a back cover, having an indentation opened at one side edge thereof, wherein the indentation is opened in the position corresponding to the adapter so that an opening can be formed between the digital signage panel and the back cover as the back cover covers up the back side of the digital signage panel; and a circuit board module, having a frame and a circuit board, wherein the frame has a side cover disposed on one side thereof and a rail disposed on each side at the lower end thereof and the circuit board, being disposed on the frame, has a slot disposed on one side thereof and a connecting terminal disposed on the other one side thereof, the slot having an interface socket card plugged thereon with at least one interface card slot and the connecting terminal being connected to the connector of the connector interface, wherein the rail of the circuit board module is placed into the track of the adapter through the opening between the digital signage panel and the back cover.

2. The digital signage replacement module according to claim 1, wherein the track has at least one raised line disposed thereon.

3. The digital signage replacement module according to claim 1, wherein the interface card slot is used for plugging display cards, video cards and other interface cards.

4. The digital signage replacement module according to claim 1, wherein the side cover has fixtures disposed at both ends thereof for fixing the circuit board module on the opening of the back cover.

5. The digital signage replacement module according to claim 1, wherein the side cover has a handle disposed thereon.

6. The digital signage replacement module according to claim 1, wherein the side cover has a plurality of through-holes disposed thereon.

7. The digital signage replacement module according to claim 4, wherein the fixtures are locking knobs, buckle pieces or other positioning members.

* * * * *